(12) United States Patent
Ziemer

(10) Patent No.: US 7,637,840 B2
(45) Date of Patent: Dec. 29, 2009

(54) PLANETARY TRANSMISSION, ESPECIALLY DUAL-CLUTCH PLANETARY TRANSMISSION

(75) Inventor: Peter Ziemer, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 502 days.

(21) Appl. No.: 10/593,381

(22) PCT Filed: Mar. 22, 2005

(86) PCT No.: PCT/EP2005/002997

§ 371 (c)(1),
(2), (4) Date: Sep. 20, 2006

(87) PCT Pub. No.: WO2005/093291

PCT Pub. Date: Oct. 6, 2005

(65) Prior Publication Data

US 2007/0149345 A1 Jun. 28, 2007

(30) Foreign Application Priority Data

Mar. 23, 2004 (DE) .................. 10 2004 014 082

(51) Int. Cl.
*F16H 3/08* (2006.01)
*F16H 3/44* (2006.01)
(52) U.S. Cl. .................... 475/286; 475/303; 74/330
(58) Field of Classification Search ............... 475/286, 475/303; 74/330
See application file for complete search history.

(56) References Cited

U.S. PATENT DOCUMENTS 2,150,950 A 3/1939 Thoma (Continued)

FOREIGN PATENT DOCUMENTS

DE 1 211 077 2/1966

(Continued)

*Primary Examiner*—Tisha D Lewis
(74) *Attorney, Agent, or Firm*—Davis & Bujold, P.L.L.C.

(57) ABSTRACT

A dual clutch planetary transmission (1) having at least four planetary gear sets (P1 to P4), at least two frictional shifting elements (K1, K2) for the shifting into different power paths in a power flow, and a plurality of shape-fit, shifting elements (A, B1, B2, D, E1, E2, F) for the attainment of various ratio stages for the power paths. The frictional shifting elements (K1, K2) and the shape-fit, shifting elements (A, B1, B2, D, E1, E2, F) are so positioned between shafts (S1, ST1, HR1, S2, ST2, HR2, S3, ST3, HR3, S4, ST4, HR4) of the planetary gear sets (P1 to P4), a housing (2), a transmission input shaft (3) and a transmission output shaft (4) that gear stage change, at least in a lower gear range (1 to 6), can be accomplished free of interruption in traction. At least one of the frictional shifting elements (K1, K2) is a clutch. Further, the second planetary gear set (P2), the third planetary gear set (P3) and the fourth planetary gear sets (P4) form a 3-carrier-5-shaft transmission apparatus with separate planetary gears (PR2 to PR4), via a double planetary gear, without intermediate stages.

24 Claims, 10 Drawing Sheets

U.S. PATENT DOCUMENTS

| | | | |
|---|---|---|---|
| 2,209,385 A | 7/1940 | Burtnett | |
| 2,530,200 A | 11/1950 | Hobbs | |
| 4,223,571 A * | 9/1980 | Quemerais et al. | 475/276 |
| 4,395,925 A | 8/1983 | Gaus | |
| 6,524,208 B1 | 2/2003 | Hollermann et al. | |
| 6,572,507 B1 | 6/2003 | Korkmaz et al. | |
| 6,663,528 B1 * | 12/2003 | Haka | 475/303 |
| 6,669,596 B1 | 12/2003 | Sefcik | |
| 6,758,787 B2 * | 7/2004 | Usoro et al. | 475/296 |
| 7,004,881 B2 * | 2/2006 | Haka | 475/303 |
| 7,175,563 B2 * | 2/2007 | Baldwin | 475/276 |
| 2003/0199360 A1 | 10/2003 | Biallas | |

FOREIGN PATENT DOCUMENTS

| | | |
|---|---|---|
| DE | 29 36 969 A1 | 4/1981 |
| DE | 31 31 138 A1 | 2/1983 |
| DE | 199 12 480 A1 | 9/2000 |
| EP | 1 389 696 A2 | 2/2004 |
| EP | 1 435 477 A2 | 7/2004 |
| GB | 2 103 736 A | 2/1983 |
| WO | WO-2004/020238 A2 | 3/2004 |

* cited by examiner

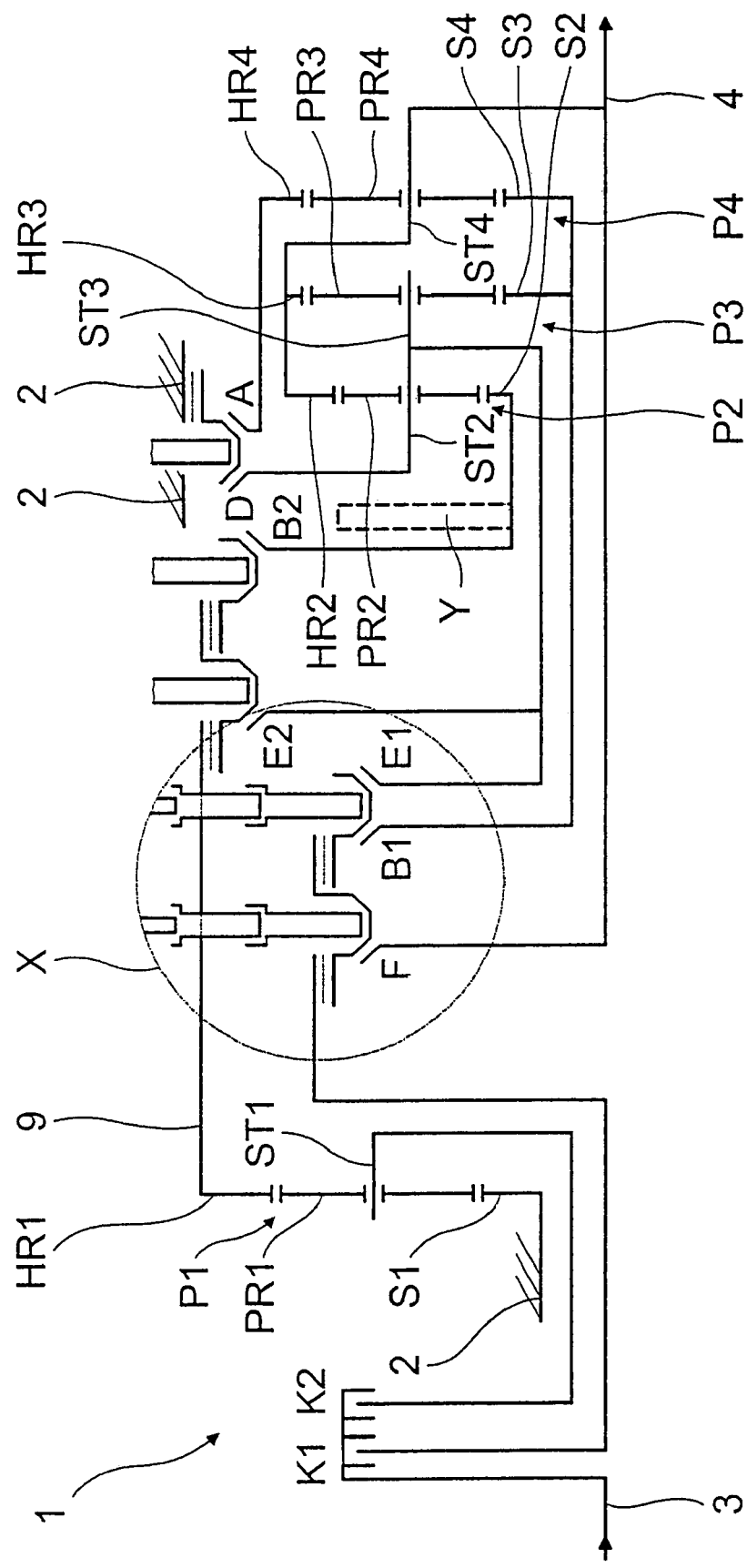

|   | K1 | K2 | B1 | B2 | E1 | E2 | F | A | D | eta | i_ges | phi |
|---|---|---|---|---|---|---|---|---|---|---|---|---|
| "1" | ● |  | ● |  |  |  |  | ● |  | 0.985 | 4.200 | 1.62 |
| "2" |  | ● |  | ● |  |  |  | ● |  | 0.961 | 2.596 | 1.46 |
| "3" | ● |  |  |  | ● |  |  | ● |  | 0.985 | 1.769 | 1.33 |
| "4" |  | ● |  |  |  | ● |  | ● |  | 0.980 | 1.327 | 1.33 |
| "5" |  |  |  |  |  | ● | ● |  |  | 1.000 | 1.000 | 1.33 |
| "6" | ● |  | ● |  |  |  |  |  | ● | 0.995 | 0.750 |  |
| "R1" |  | ● |  |  |  |  |  |  | ● | 0.980 | -3.160 | 5.6 |
| "R2" |  | ● |  | ● |  |  |  |  | ● | 0.975 | -1.650 |  |

Fig. 2a i_0_P1 = -3,00
i_0_P2 = -2,20
i_0_P3 = -3,16
i_0_P4 = -3,20

| | K1 | K2 | B1 | B2 | E1 | E2 | F | A | D | eta | i_ges | phi |
|---|---|---|---|---|---|---|---|---|---|---|---|---|
| "1" | ● | | ● | | | | | ● | | 0.985 | 4.200 | 1.62 |
| "2" | | ● | | ● | | | | ● | | 0.961 | 2.596 | 1.46 |
| "3" | ● | | | | ● | | | ● | | 0.985 | 1.769 | 1.33 |
| "4" | | ● | | | | ● | | ● | | 0.980 | 1.327 | 1.33 |
| "5" | ● | | | | | | ● | | | 1.000 | 1.000 | 1.33 |
| "6" | | ● | ● | | | ● | | | | 0.995 | 0.750 | 1.33 |
| "7" | ● | ● | ● | | | ● | | | | 0.992 | 0.695 | 1.08 |
| "R1" | ● | ● | | | | | | | ● | 0.980 | -3.160 | 6.04 |
| "R2" | | ● | | ● | | | | | ● | 0.975 | -1.650 | |

Fig. 2b i_0_P1 = -3,00
i_0_P2 = -2,20
i_0_P3 = -3,16
i_0_P4 = -3,20

| | K1 | K2 | B1 | B2 | E1 | E2 | F | A | D | C | eta | i_ges | phi |
|---|---|---|---|---|---|---|---|---|---|---|---|---|---|
| "1" | ● | | ● | | | | | ● | | | 0.985 | 4.200 | 1.62 |
| "2" | ● | ● | | ● | | | | ● | | | 0.961 | 2.596 | 1.46 |
| "3" | ● | | | | ● | | | ● | | | 0.985 | 1.769 | 1.33 |
| "4" | | ● | | | | ● | | ● | | | 0.980 | 1.327 | 1.33 |
| "5" | ● | | | | | | ● | | | | 1.000 | 1.000 | 1.33 |
| "6" | | ● | ● | | | ● | | | | | 0.995 | 0.750 | 1.08 |
| "7" | ● | ● | ● | | | ● | | | | | 0.992 | 0.695 | 1.35 |
| "8" | | ● | | | | ● | | | | ● | 0.989 | 0.516 | |
| "R1" | | ● | | | | | | | ● | | 0.980 | -3.160 | 8.15 |
| "R2" | | ● | | ● | | | | | ● | | 0.975 | -1.650 | | i_0_P1 = -3,00
i_0_P2 = -2,20
i_0_P3 = -3,16
i_0_P4 = -3,20

Fig. 2c

| | K1 | K2 | B1 | B2 | E1 | E2 | F | A | D | eta | i_ges | phi |
|---|---|---|---|---|---|---|---|---|---|---|---|---|
| "1" | ● | | ● | | | | | ● | | 0.985 | 3.880 | 1.40 |
| "2" | | ● | | ● | | | | ● | | 0.965 | 2.771 | 1.41 |
| "3" | ● | ● | | | ● | | | ● | | 0.984 | 1.960 | 1.40 |
| "4" | | ● | | | | ● | | ● | | 0.978 | 1.400 | 1.40 |
| "5" | ● | | | | | | ● | | | 1.000 | 1.000 | 1.40 |
| "6" | | ● | ● | | | ● | | | | 0.994 | 0.714 | |
| "R1" | ● | ● | | ● | | | | | ● | 0.980 | -2.000 | 5.43 |
| "R2" | | ● | | ● | | | | | ● | 0.975 | -1.410 | |

Fig. 4a i_0_P1 = -2,50
i_0_P2 = -2,00
i_0_P3 = -2,00
i_0_P4 = -2,88

|     | K1 | K2 | B1 | B2 | E1 | E2 | F | A | D | eta | i_ges | phi |
|-----|----|----|----|----|----|----|----|----|----|-------|--------|------|
| "1" | ●  |    |    |    |    |    |    | ●  |    | 0.985 | 3.880 | 1.40 |
| "2" | ●  | ●  | ●  | ●  |    |    |    | ●  |    | 0.965 | 2.771 | 1.41 |
| "3" |    | ●  |    |    | ●  |    |    | ●  |    | 0.984 | 1.960 | 1.40 |
| "4" |    | ●  |    | ●  |    | ●  |    | ●  |    | 0.978 | 1.400 | 1.40 |
| "5" | ●  |    |    |    |    |    | ●  |    |    | 1.000 | 1.000 | 1.40 |
| "6" |    | ●  | ●  | ●  |    | ●  |    |    |    | 0.994 | 0.714 | 1.40 |
| "7" | ●  | ●  | ●  |    |    | ●  |    |    |    | 0.990 | 0.625 | 1.14 |
| "R1"| ●  |    |    |    |    |    |    |    | ●  | 0.980 | -2.000 | 6.21 |
| "R2"| ●  | ●  |    | ●  |    |    |    |    | ●  | 0.975 | -1.410 |      | i_0_P1 = -2,50
i_0_P2 = -2,00
i_0_P3 = -2,00
i_0_P4 = -2,88

Fig. 4b

| | K1 | K2 | B1 | B2 | E1 | E2 | F | A | D | C | eta | i_ges | phi |
|---|---|---|---|---|---|---|---|---|---|---|---|---|---|
| "1" | ● | | ● | | | | | | | | 0.985 | 3.880 | 1.40 |
| "2" | ● | ● | | ● | | | | | | | 0.965 | 2.771 | 1.41 |
| "3" | ● | ● | | | ● | | | | | | 0.984 | 1.960 | 1.40 |
| "4" | ● | ● | | | | ● | | | | | 0.978 | 1.400 | 1.40 |
| "5" | ● | | | | | | ● | | | | 1.000 | 1.000 | 1.40 |
| "6" | ● | ● | | ● | | ● | | | | | 0.994 | 0.714 | 1.40 |
| "7" | ● | ● | ● | | | ● | | | | | 0.990 | 0.625 | 1.14 |
| "8" | ● | ● | ● | | | ● | | | | ● | 0.988 | 0.476 | 1.31 |
| "R1" | | ● | ● | | | | | | ● | | 0.980 | -2.000 | 8.15 |
| "R2" | | ● | | ● | | | | | ● | | 0.975 | -1.410 | |

Fig. 4c i_0_P1 = -2,50
i_0_P2 = -2,00
i_0_P3 = -2,00
i_0_P4 = -2,88

PLANETARY TRANSMISSION, ESPECIALLY DUAL-CLUTCH PLANETARY TRANSMISSION

This application is a national stage completion of PCT/EP2005/002997 filed Mar. 22, 2005 which claims priority from German Application Serial No. 10 2004 014 082.0 filed Mar. 23, 2004.

FIELD OF THE INVENTION

The invention concerns a planetary transmission, especially a dual-clutch version in the manner of a planetary transmission with a plurality of planetary gear sets, with at least two frictional shifting elements and with a plurality of shape-fit, shifting devices.

BACKGROUND OF THE INVENTION

Step-wise automatic transmissions are known in the practice, these transmissions are constructed, at least in a planetary transmission design or as auxiliary transmissions. Stepwise automatic transmissions, constructed in accordance with planetary design, are equipped with hydro-dynamic torque converters as starting elements as well as with frictional shifting means so that, with this type of transmission, shifting can be carried out without an interruption in continuous traction. So that the motor torque in the drive string, which is to be conducted to the output drive shaft can be transferred by the frictional shifting element, it is necessary that these frictional elements are relatively large sized. In this case, however, the shifting element proves disadvantageous, since draw-power losses when towing or large losses in the disengaged state thereof occur. Since the frictional shifting elements are generally hydraulically operated, a large and complex hydraulic circuit with a hydraulic pumping system is necessary which, because of a pick-up capacity of the pump arrangement and by leakage losses, leads to a deterioration of the efficiency of the transmission. The draw-power losses can be reduced by the insertion of a substitution for the frictional shifting element. However, in such a case, the exchange of the gear stage would then be, disadvantageously, carried out with the occurrence of traction interruptions.

In order to execute shifting, which is free of traction interruptions, with automatic step-wise transmissions, even of the auxiliary type, these, for example, must be constructed as the so-called dual-clutch transmissions. This type of transmission possesses two frictional shifting elements by which two power strings are shifted into the power flow or, alternately, may be shifted out of the power flow. In the two power strings, shape-fit, shifting element gear pairings of various ratios, have the capability of shifting "into" or "out of". In this case, the ratios of the power strings can then be adjusted or changed, if the currently employed power string is not precisely shifted into the power flow, but rather finds itself in a load-free condition. In the area of operating, shape-fit, shifting elements, in comparison to frictional shifting elements, there appears an essentially smaller torque so that lower losses occur and efficiency in a small transmission assembly is thereby enhanced.

The dual-clutch transmissions which are built in the auxiliary manner in comparison to the planetary transmissions, however, are characterized by a lower power density; on account of this, in a case of the same number of the gear steps, a demand for more construction room space is called for. However, especially where motor vehicles are concerned, such extra space is available only in severely restricted amounts.

Further, an effective degree of gear efficiency in an auxiliary transmission lies somewhat at the lower level of handshifting, which is caused by a known dual-spur, gear engagement. Contrary to this, planet gear transmissions possess an efficiency, which is dependent upon the currently involved gear set scheme. This is true especially in the principally used driving gears and the transmission efficiency is higher than in the case of a coaxially designed auxiliary transmission.

DE 31 31 138 A1 discloses a, planetary gear transmission with changeable load shiftings. This is intended for motor vehicles having automatic transmission control and a plurality of coupled planetary gear sets. The vehicles are known to also have shifting clutches and shifting brakes for the formation of drive strings with different ratios in which only two shifting clutches which, for example, are installed on the motor drive shaft as load shifting clutches. These, as directed, transmit drive torque over two drive strings. The remaining shifting clutches and shifting brakes then can always be shifted, if they are not already included in the transfer of the torque. By an appropriate selection and arrangement of the coupled planetary gear sets, shifting clutches and shifting brakes in combination with the two load-shifting clutches, there arises a high multiple usage of the individual construction elements as well as a simple assembly with satisfactory ratios and a relatively high number of gear positions.

The known load-shifting, planetary transmission of DE 31 31 138 A1, however, possesses the disadvantage that its planetary gear sets are bound by stepped dual planetary gears, which are characterized by high manufacturing costs. These gears are also subject to off-axial deviations, which contribute to lessening the efficiency of the gear engagement of the planetary gear sets.

Hence, the present invention has the purpose of making a planetary transmission available with a high operational efficiency.

SUMMARY OF THE INVENTION

The invented planetary transmission possesses a plurality of planetary gear sets. The transmission has at least two frictional shifting elements for the attainment of various selections in power flow and possesses a plurality of shape-fit, shifting elements for the imposition of different gear ratio steps. Further, the frictional shifting elements and the shape-fit, shifting element are so inserted between the shafts of the planetary gear set and a housing as well as between a transmission input shaft and a transmission output drive shaft; that gear step change at least in one lower gear step range by the frictional shifting element can be carried out free of interruption in traction. In addition, at least one of the frictional shifting elements is designed as a clutch. The assembly of the above is simple and economical in its manufacture.

The purpose is achieved in that a second planetary gear set, a third planetary gear set and fourth planetary gear set form a 3-planetary carrier-5 shaft-transmission apparatus and the planetary gear set of the 3-carrier-5-shaft transmission apparatus is equipped with separate planetary gears in which comparison to stepped dual planetary gears, which sets are simpler and less expensive to manufacture. Additionally, with the separate planetary gears, a higher degree of transmission efficiency is achieved at an essentially lower construction expense than in the case of stepped dual planetary gear assemblies.

These mentioned advantages with regard to an alternative embodiment of the invented planetary transmission are gained in that a second planetary gear set, a third planetary gear set and a fourth planetary gear set combine to produce a reduced 3-carrier-5-shaft-transmission apparatus, wherein two of the aforesaid planetary gear sets are connected together by dual planetary gears without a mutual stepping occurrence.

Moreover, with the invented planetary transmission, advantageous shifting or gear step changes, at least in the lower gear stepping range, i.e., the principal driving range, are free of interruptions to traction. Further, the values of transmission efficiency in the individual gear stages are carried out and are essentially above those of an auxiliary transmission.

This state is arrived at, in that the planetary transmission is constructed with a plurality of planetary gear sets, which are characterized by a favorable transmission efficiency. Additionally, in the planetary transmission, various ratio stages or gear stages are attained by the combination of individual shafts of the planetary gear sets and shape-fit, shifting elements which, in comparison to frictional shifting elements, are characterized by small slipping torques.

Additionally, two frictional shifting elements are provided, which allow that, alternately, by the shape-fit, shifting elements, shifting can be carried out into power paths generated by the planetary transmission into the power flow or, conversely, can be shifted out of the power flow. This permits that those shape-fit, shifting elements arranged in a power train, which are not actually there in, can now be shifted. This shifting is without load and is a change from an already shifted into power path, which itself represents the current gear stage in the power flow of the planetary transmission. The change is a downshift to a power path which represents a new, higher or lower gear stage in which various shafts of the planetary gear sets bind themselves to one another or advantageously bind against a housing-affixed component. The shape-fit, shifting elements allow such cross-shifting to be carried out free of any break in traction.

In addition, the frictional shifting elements and the shape-fit, shifting elements, in the case of the planetary transmission, are so arranged that different gear ratio stages can be attained in the planetary gear set, respectively, by a power path shifted into by a load-free frictional shifting element prior to the power flow of the respective planetary transmission. Subsequently the power path of the new gear stage is re-oriented into the power flow of the transmission by the closure of the disengaged frictional shifting elements. As this is carried out, the power path, which is actually within the power flow of the gear stage and is to be shifted out of, is diverted out of the power flow by the disengaging of the engaged frictional shifting element.

Immediately following the above, the power path of the downshifted gear stage is free of load, whereby now and the possibility exists of changing the gear ratio of the load-free power path of the respective planetary gear set by appropriate shifting of the shape-fit, shifting element. This, in turn, means that a shifting, which is free of traction interruption or a gear change free of traction interruption in an invented planetary gear set, can be carried out under load-free conditions in connection with a gear ratio change by a two-sided "in", "out" downshifting of the two frictional shifting elements.

Thus, the invented planetary gear set unites the advantages of a conventional planetary transmission. That is to say, a high power density with a simultaneously favorable transmission efficiency in combination with the advantages of a dual-clutch transmission, which has been constructed in an auxiliary manner, wherein shiftings, which are free of traction interruptions, are carried out with low slip torques related to the shifting element.

BRIEF DESCRIPTION OF THE DRAWINGS

The invention will now be described, by way of example, with reference to the accompanying drawings whereby, for the sake of clarity, the same reference numerals were used for the same, or for similarly functional components:

FIG. 1 is a schematic gear arrangement of an invented planetary transmission;

FIG. 2a is a schematic of the shifting elements of the gear arrangement of FIG. 1, which the arrangement is operated as a 6-gear stage transmission;

FIG. 2b is a schematic of the shifting elements of the gear arrangement of FIG. 1, which said arrangement is operated as a 7-gear stage transmission;

FIG. 2c is a schematic of the shifting elements of the gear arrangement of FIG. 1, which said arrangement is operated as an 8-gear stage transmission;

FIG. 4a is a schematic of the shifting element of the gear arrangement of FIG. 3, which is operated as a 6-gear stage transmission;

FIG. 4b is a schematic of the shifting element of the gear arrangement of FIG. 3, whereby the planetary transmission is operated as a 7-gear stage transmission;

FIG. 4c is a schematic of the shifting element of the gear arrangement of FIG. 3, whereby the planetary transmission is operated as an 8-gear stage transmission;

DETAILED DESCRIPTION OF THE INVENTION

Figure 3:
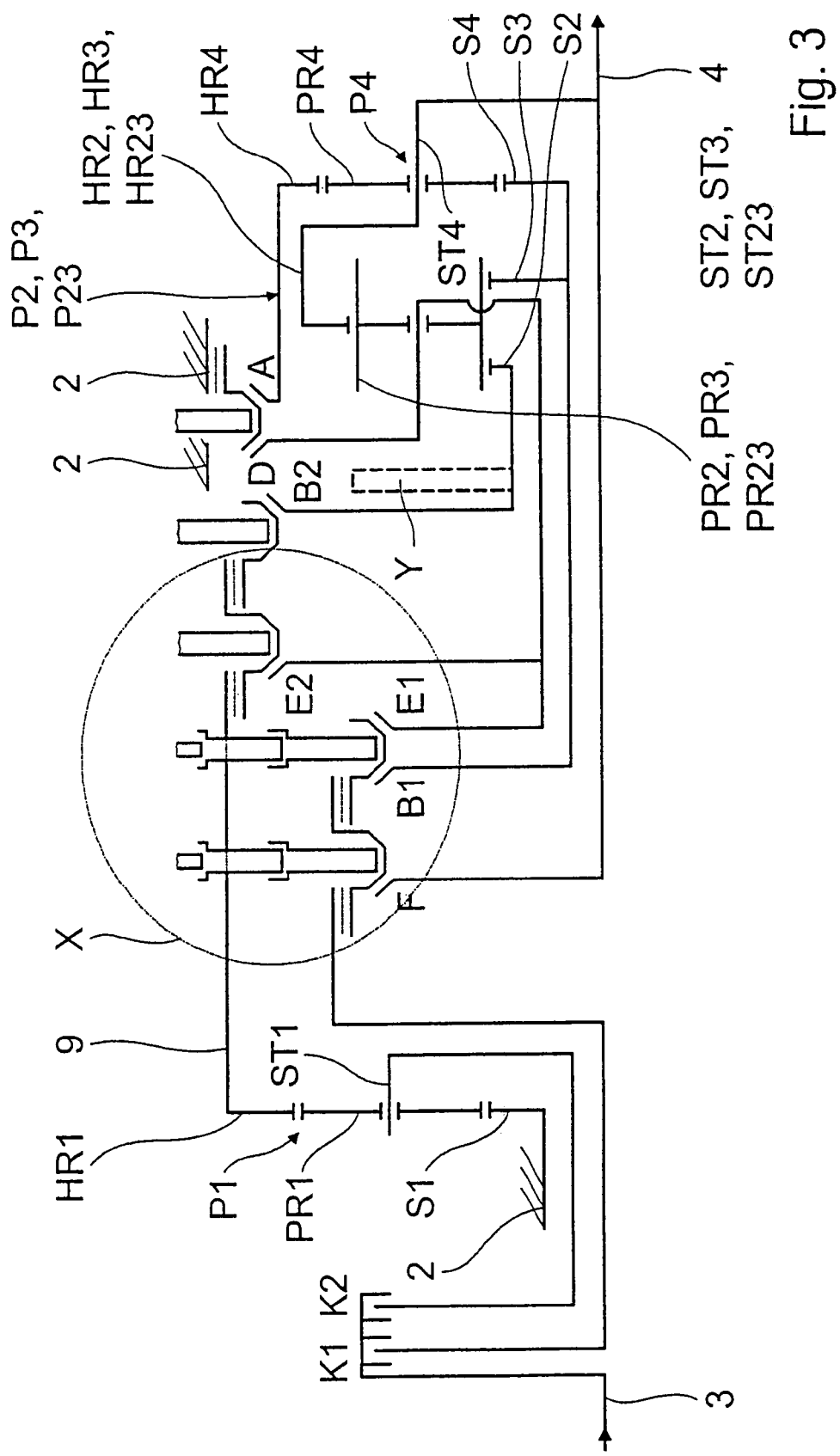
FIG. 3 is a gear schematic of an additional embodiment of the planetary transmission in accordance with the invention.

In FIG. 1 is schematically presented a gear arrangement of a planetary transmission 1, that is, of a dual-clutch transmission designed as a planetary transmission with four planetary gear sets P1 to P4, two frictional shifting elements K1, K2 and with a plurality of shape-fit, shifting elements, namely A, B1, B2, D, E1, E2 and F which are in conventional synchronization. Obviously, the shifting elements A to F can alternately be considered to be non-synchronized, shape-fit, shifting elements.

The frictional shifting elements K1 and K2 are provided for shiftings into various power paths in a power flow of the planetary transmission 1. The shape-fit, shifting elements A to F are provided for the setting of various gear ratio stages in the power paths of the planetary transmission 1. Further, the frictional shift elements K1 and K2 as well as the shape-fit, elements A to F are placed in such a manner between the shafts of the planetary gear sets P1 to P4, and a housing, i.e., housing-affixed components 2 of the planetary transmission 1 and also a transmission input shaft 3 and a transmission output drive shaft 4, that gear stage changing by the frictional shifting elements K1 and K2 can be executed without interruption of traction.

The first planetary gear set P1 is presently installed as a simple planetary gear set, which plays the role of a preliminary gear set. Further, the second planetary gear set P2, the third planetary gear set P3 and the fourth planetary gear set P4 form, in combination, one main gear train, which serves the purpose of a 3-carrier-5-shaft gear set. In this arrangement, an internal gear HR2 of the second planetary gear set P2 is bound with an internal gear HR3 of the third planetary gear set P3. Additionally, a carrier ST2 of the second planetary gear set P2 is combined with a carrier ST3 of the third planetary gear set P3.

The internal gear HR3 of the third planetary gear set P3 is connected with a carrier ST4 of the fourth planetary gear set P4 which, in turn, is bound to rotate in common with the transmission output drive shaft 4 of the planetary transmission 1. Further, a sun gear S3 of the third planetary gear set P3 is connected with a sun gear S4 of the fourth planetary gear set P4.

A sun gear S1 of the first planetary gear set P1 is presently anchored to the housing-affixed component 2 and is, on this account, not rotatable in the housing of the planetary transmission 1. A planetary carrier ST1 of the first planetary gear set P1 can be connected with the transmission input shaft 3 by the second frictional shifting element K2. At the same time, an internal gear HR1 of the first planetary gear set P1, by the shape-set, shifting element B2, can be connected to the sun gear S2 of the second planetary gear set P2 or by the shape-fit, shifting element E2 with the carrier ST2 of the second planetary gear set P2. Between the sun gears S1 to S4 and the internal gears HR1 to HR4 the four planetary gear sets rotate planetary gears PR1 to PR4, respectively, in a known way and manner.

The frictional shifting elements K1 and K2 are presently placed in the area of the transmission power entry of the planetary transmission 1 and are constructed as frictional, lamellar clutches whereby, adapting the frictional shifting elements K1 and K2 to be wither wet or dry running obviously lie in the educated judgment of the expert.

The shape-fit, shifting elements A to F are laid out in axial extension of the planetary transmission 1 between the first planetary gear set P1 and the second planetary gear set P2 and are made with a mutual synchronization so that possible existing speed of rotation differences between the two are compensated for by a shape-fit, shifting element to connecting components of the planetary transmission 1 in a simple manner.

The internal gear HR4 of the fourth planetary gear set P4 can be connected with the housing-affixed component 2 by the shape-fit, shifting element A. The carrier ST2 of the second planetary gear set P2 is, likewise, connected with the housing-affixed component 2 by the shape-fit, shifting element D.

The sun gear S2 of the second planetary gear set P2 can be connected with the internal gear HR1 of the first planetary gear set P1 by the shape-fit, shifting element B2, while the sun gear S2 of the second planetary gear set P2 can additionally be connected with the carrier ST3 of the third planetary gear set P3, at the same time, if the shape-fit, shifting element E2 is engaged along with the shape-fit, shifting element B2.

The sun gear S3 of the third planetary gear set P3 is connected with the transmission input shaft 3, providing both the shape-fit, shifting element B1 as well as the first frictional shifting element K1 is engaged. If the first frictional shifting element K1 and the shape-fit, shifting element F are engaged, then the transmission input shaft 3 is bound to the transmission output drive shaft 4.

The carrier ST1 of the first planetary gear set P1 stands in operational communion with the sun gear S3 of the third planetary gear set P3, if the shape-fit, shifting elements B1 and E2 and the two frictional shifting elements K1 and K2 are engaged.

Figure 6:
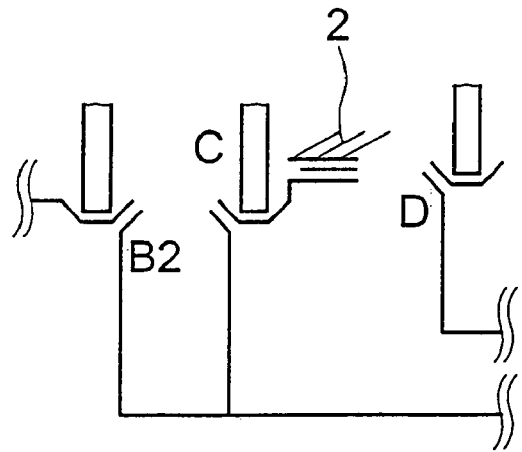
FIG. 6 is an enlarged detailed presentation, providing a more detailed view of the area Y of the FIGS. 1 and 3.

In FIG. 1, between the sun gear S2 of the second planetary gear set P2 and the shape-fit, shifting element B2, is to be found a dotted line enclosed area Y, which is represented in a detailed drawing FIG. 6 of a more closely described shape-fit, shifting element C of the planetary transmission, which can be optionally integrated into the planetary transmission 1. The additional shape-fit, shifting element C is provided for the illustration of an eighth forward gear stage whereby, without the shifting element C, in the planetary transmission 1 presented in FIG. 1, six or seven forward gear stages and two reverse stages can be shown. The detailed shifting schematics, depicted in FIGS. 2a to 2c, again respectively provide the common functionality between the individual gear ratio steps of the planetary transmission 1 and the shifting elements A to F.

The shifting schematics, shown on FIGS. 2a to 2c, are in the form of a table, in which the left column depicts the individual gear stages, namely "1", "2", "3", "4", "5", "6", "7", "8", "R1" and "R2". Further, in the top row of the shifting scheme are placed the individual shifting elements K1, K2, B1, B2, E1, E2, F, A, D and C, an efficiency designated eta of the planetary transmission 1, an overall ratio i_ges of the planetary transmission 1, all in the case of the currently set gear stage. Included as well in the last column is the stage jump, namely phi which, respectively is computed from a quotient of the values of two successively following overall ratios, i.e., i_ges.

Those shifting elements of the planetary transmission 1, which are engaged for the setting of a gear stage, are marked in the shifting schemes by a black dot, whereby those cells of the shifting schemes, where no black dot is to be found, indicate those shifting elements which are disengaged.

From the shifting schematic, in accordance with FIG. 2a, may be determined, for example in connection with the gear schematic presented in FIG. 1 of the planetary transmission 1, that for the setting of a first gear stage "1", i.e., the first total ratio i_ges of the planetary transmission 1, the shifting elements K1, B1 and A are engaged, in other words, have been shifted into. In this operational condition of the planetary transmission 1, there occurs a through-passage of a drive torque of the engine of a motor vehicle, which has been introduced by the transmission input shaft 3 of the planetary transmission 1 through the sun gear S4 (in succession), the planet gears PR4 and the internal gear HR4 of the fourth planetary gear set P3 to the carrier ST4 of the fourth planetary gear set P4, and from thence, further forwarded to the transmission output shaft 4. In this shifting state of the planetary transmission 1, the drive torque of the transmission input shaft 3 is conducted through a power branch accessed by the first frictional shifting element K1 of the planetary transmission 1 in the direction of the transmission output shaft 4 of the vehicle. The total ratio i_ges in the first gear stage "1" of the planetary transmission 1 possesses the value 4.2 and the planetary transmission 1 will be operating with a transmission efficiency of approximately 0.985.

For the presentation of the second gear stage "2", the two shape-fit, shifting elements B2 and A, as well as the second frictional shifting element K2, are engaged whereby an efficiency of the planetary transmission of 0.961 is achieved and the total ratio i_ges runs at 2.596. Therewith, between the first gear stage "1" and the second gear stage "2" of the planetary transmission 1 exhibits a stage jump of 1.62.

The up-shifting accomplished by the first gear stage "1" into the second gear stage "2" of the planetary transmission can be carried out in the planetary transmission 1, as shown in FIG. 1, without an interruption in the traction since, in the case of a corresponding shifting demand, first, the load-free shape-fit, shifting element B2, upon the disengaged second frictional shifting element K2, is engaged. Subsequently, the second frictional shifting element K2, advantageously corresponding to a self-actuated, superimposed shifting, is engaged by a slip phase while, simultaneously the first frictional shifting element K1, in a corresponding manner, is disengaged. As this operation proceeds, the transfer capabilities of the two frictional shifting elements K1 and K2 are adjusted in such a manner by a control center of the planetary transmission 1 (not further described), that the gear stage exchange is free of interruption of traction and can be carried out in complete comfort.

After the ending of the gear stage exchange, that is, of the up-shifting and after the power path has been previously shifted into by the second frictional shifting element K2, the drive torque of the transmission input shaft 3 is now transmitted through the power path of the planetary transmission 1 toward the transmission output shaft 4. Because of the disengaged first frictional shifting element K1, the load-free shifted, shape-fit, shifting element K1 can now be disengaged in a simple manner so that by the shape-fit, shifting element B1 no more torque can be transmitted.

If an additional demand for an up-shift is made with regard to the second gear stage "2" into the third gear stage "3" of the planetary transmission 1, then the load-free, shape-fit, shifting element E1 is engaged, which is allowed in a case of an disengaged frictional shifting element K1. Subsequently, in the manner already explained, the transfer facility of the first frictional shifting element K1 is lifted and the transfer capability of the second frictional shifting element K2 is reduced so that the power path of the planetary transmission 1, which was up-shifted into by the second frictional shifting element K2, is down-shifted and the power path now generated by the shape-fit, shifting element E1 in common with the shape-fit, shifting element A, is transferred by the first frictional shifting element K1 into the power-flow of the planetary transmission 1. Subsequently, in a case of an disengaged second frictional shifting element K2, the load-free shape-fit, shifting element B2 can be disengaged in a simple way and manner.

The additional gear stages "4", "5" and "6" of the planetary transmission 1 can be free of traction interruptions, in a similar manner, by alternative up-shifting and down-shifting of the two frictional shifting elements K1 and K2. In this case, the shape-fit, shifting elements for the presentation of the gear stages "4", "5" and "6" are engaged prior to the up-shifting of the respective power path and after the down-shifting of the gear stages to be so down-shifted, can be disengaged in a load-free condition. Moreover, all retro-shifting between the gear stages "1" to "6" can be carried out traction-free within the prescribed method.

The complete ratio i_ges carried out in the FIGS. 2a to 2c are attained with the planetary gear sets P1 to P4, with specified characteristic ratios. In this regard, the first planetary gear set P1 possesses a characteristic ratio i_0_P1 of −3.00. The second planetary gear set is made with a characteristic ratio of i_0_P2 of −2.20, while the characteristic ratios i_0_P3 and i_0_P4, respectively, refer to the third and fourth planetary gear sets, namely P3 and/or P4 which have characteristic ratios of, again respectively, −3.16 and −3.2.

The shifting scheme presented in FIG. 2b shows, in comparison to the scheme of FIG. 2a, an additional forward gear stage "7". For the attainment of the seventh gear stage "7", the two frictional shifting elements K1 and K2, as well as the shape-fit, shifting elements B1 and E2, are engaged. This means that both the up-shift engendered by the sixth gear stage "6" into the seventh gear stage "7", as well as the back shift out of the seventh gear stage "7" into the sixth gear stage "6" can only be done in company with an interruption in the traction in order to cross-over shift between the two shape-fit, shifting elements B1 and B2. The shiftings between the gear stages "1" to "6", which form a subordinate gear range of the main driving area, can be executed now as before without interruptions in the traction.

The shifting scheme in accordance with FIG. 2c exhibits, in comparison to shifting scheme 2b, still another forward gear stage, namely "8", which can be realized by the aforementioned shape-fit, shifting element C.

Relying on the respectively selected embodiment of the planetary transmission 1, as set forth in the chosen operational manner of the planetary transmission 1, this possesses, as a 6-gear transmission, a total spread of 5.6; as a 7-gear transmission, the total spread is 6.04 and as an 8-gear transmission the spread becomes 8.15.

In FIG. 3 is an additional gear layout of the planetary transmission 1, which differentiates itself from that of the gear scheme of FIG. 1 of the planetary transmission 1 particularly in the area of the principal gear set. The principal gear set formed from the second planetary gear set P2, the third planetary gear set P3 and the fourth planetary gear set P4, as seen in FIG. 3, is designed as an assembled and reduced 3-carrier-5-shaft-gear train, wherein the internal gears, the planet gears and the carriers of the second and the third planetary gear sets, respectively, P2 and P3 are bound together, so that the second and the third planetary gear set P2 and P3 form themselves a planetary gear set P23. The planet gears PR2 and PR3 of the planetary gear set P2 and P3 are, in this embodiment, designed as long and stepless planetary gear set PR23, so that the assembly complexity in comparison to two separately made carrier units is increased by only one additional sun gear. Further, the internal gears HR2 and HR3, as well as the carriers ST2 and ST3 of the second and the third planetary gear sets P2 and P3, respectively, form an integral unit, which is illustrated in FIG. 3 under the reference numbers HR23 and ST23.

In FIGS. 4a to 4c, three shifting schemes are shown corresponding with the gear scheme as depicted in FIG. 3, the layout of which shifting schemes corresponds to that of FIGS. 2a to 2c, whereby the characteristic ratio i_0_P1 to i_0_P4 of the planetary sets P1 to P4 run −2.50, −2.00, −2.00 and 2.88.

The gear jumps phi between the first six forward gear stages "1" to "6" of the planetary transmission 1 in accordance with FIG. 3 present a geometric series and the total ratios i_ges of the forward gear stages "1" to "6", "1" to "7", or "1" to "8" of the planetary transmission 1, in accordance with FIG. 3, are less than the total ratios i_ges of the planetary transmission 1, shown in FIG. 1, whereby the shiftings between the gear stages "1" to "6" of the planetary transmission 1, per FIG. 3, can be carried out again free of traction interruptions in the same way and manner as in the case of the planetary transmission 1, according to FIG. 1.

Both the execution of the planetary transmission 1, according to FIG. 1, as well as the embodiment example in accordance with FIG. 3, can be carried out without the shape-fit, shifting element F, whereby shiftings between the fourth gear stage "4" and the fifth gear stage "5" can be made only with interruption of the traction.

Figure 5:
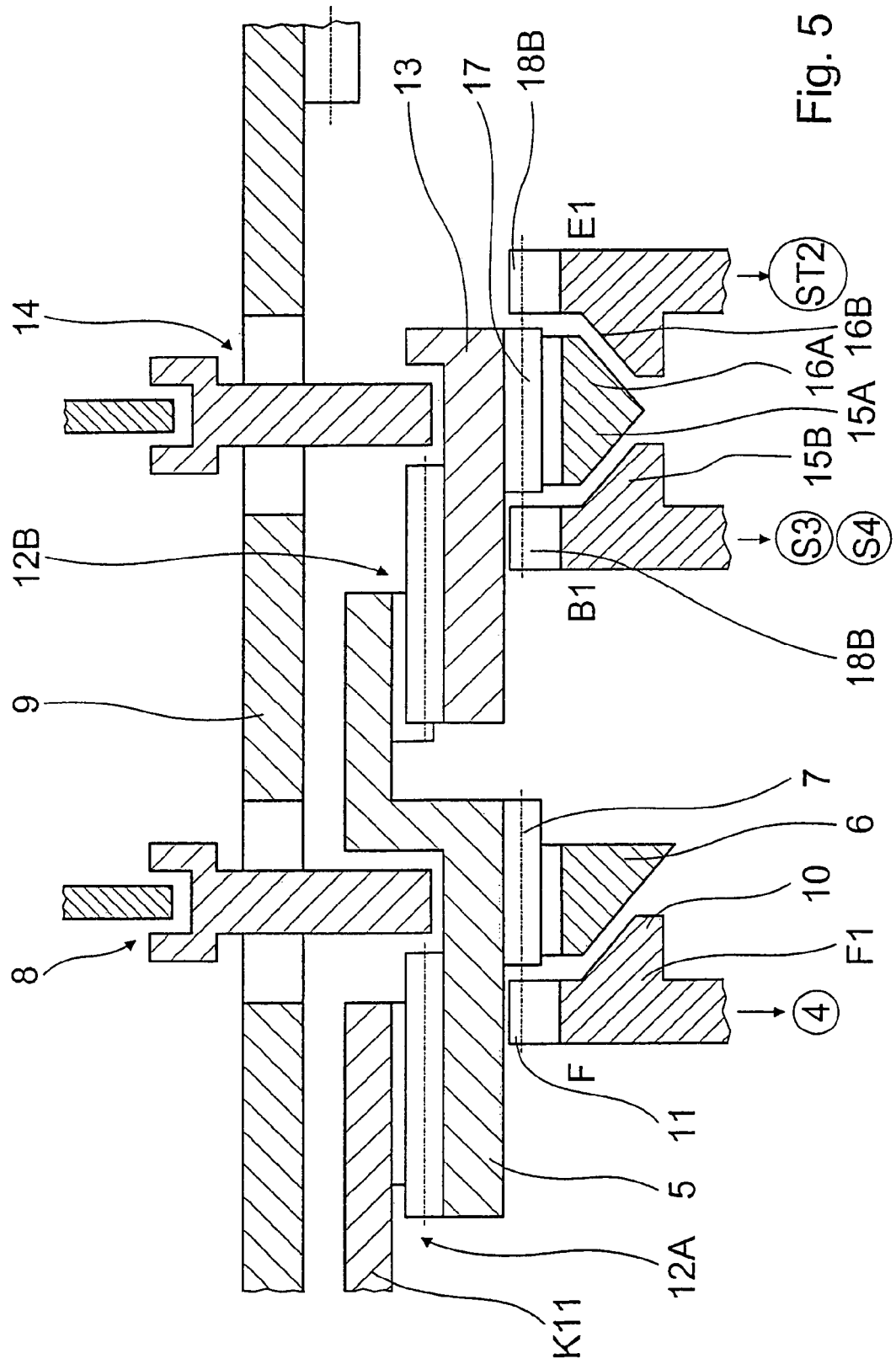
FIG. 5 is an enlarged detail presentation characterizing the circle X as shown in FIGS. 1 and 3.

The circled area X of FIGS. 1 and 3 is shown enlarged in FIG. 5 whereby, the shape-fit, shifting elements F, B1 and E1, which are serving as synchronizers, are presented in greater detail. The shifting elements F, B1 and E1 fundamentally possess a replication of conventional synchronization. Thus, a half-clutch F1 of the shifting element F, in connection with the transmission output shaft 4, by a axially moving synchronizing ring 5, which is built with a complementary cone 6 and a blocking toothing 7, can be connected with a half-clutch K11 of the first frictional shifting element K1.

To facilitate this, the synchronizer ring 5 by a shifting collar 8 has been inserted between the internal gear shape-fit, shifting HR1 of the first planetary transmission P1 and a connection shaft 9, which operates the main gear set of the planetary transmission 1, is first pressed against a counter cone 10 of the shifting element F, whereby a differing speed of rotation between the synchronizer ring 5 and the half-clutch F1 of the shape-fit, shifting element F is frictionally compensated for. With an increasing displacement path of the synchronizer ring 5 in the direction of the half-clutch F1 of the shifting element F, the difference in rotational speed is equalized and a blocking toothing 7 of the synchronizer ring 5 is brought into engagement with an additional blocking toothing 11 of the half-clutch F1 of the shifting element F, so that between the synchronizer ring 5 and the half-clutch F1 of the shifting element F, a mutual rotational connection exists.

The synchronizer ring 5, by tooth engagement at 12A, 12B, respectively, is affixed to mutually turn with the half-clutch K11 of the first frictional shifting element K1 and an additional synchronizer ring 13 to which the two shape-fit, shifting elements B1 and E1 are assigned, likewise, is turn-fast bound. The additional synchronizer ring 13, by an additional shifting collar 14, is arranged to be slidable, in such a manner, in an axial direction between the two shape-fit, shifting elements B1 and E1, that the half-clutch K11 of the first frictional shifting element K1 can be bound either with the sun gears S3 and S4 of the third, i.e., the fourth planetary gear sets P3 and P4 or with the carrier ST2 and ST3 of the second, i.e., the third planet gear set P2 and P3.

In the course of the above, the connections between the additional synchronizer ring 13 and the shifting elements B1 and E1 can be made in the same manner by complementary cone surfaces 15A and 15B, as well as 16A and 16B and blocking toothing 17 and 18A and 18B. Shifting collars 8 and 14, which engage from the outside to the inside through the connection shaft 9 into the synchronizer rings 5 and 13, are in a load free condition and the two synchronizer rings 5 and 13 can be slidably moved for the "in" or "out" shifting of the shape-fit, shifting elements F, B1 and E1 in an axial extension of the planetary transmission 1.

Figure 5A:
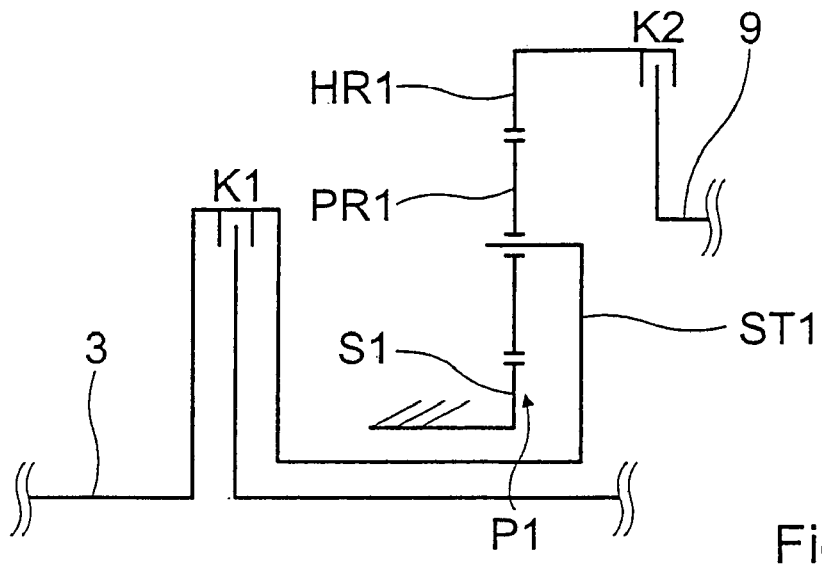
FIG. 5a is a drawing deviating from that of FIGS. 1 and 3 regarding the frictional shifting elements.

In FIG. 5a, another possibility for the arrangement of the two frictional shifting elements K1 and K2 is shown, whereby the second frictional shifting element K2 is placed between the internal gear HR1 of the first planetary gear set P1 and the connection shaft 9. As pictured in the position shown in FIG. 5a, the second frictional shifting element K2 possesses the same predetermined functionality of the planetary transmission as in the case of the planetary transmission 1, depicted in FIGS. 1 and FIG. 3.

Figure 5B:
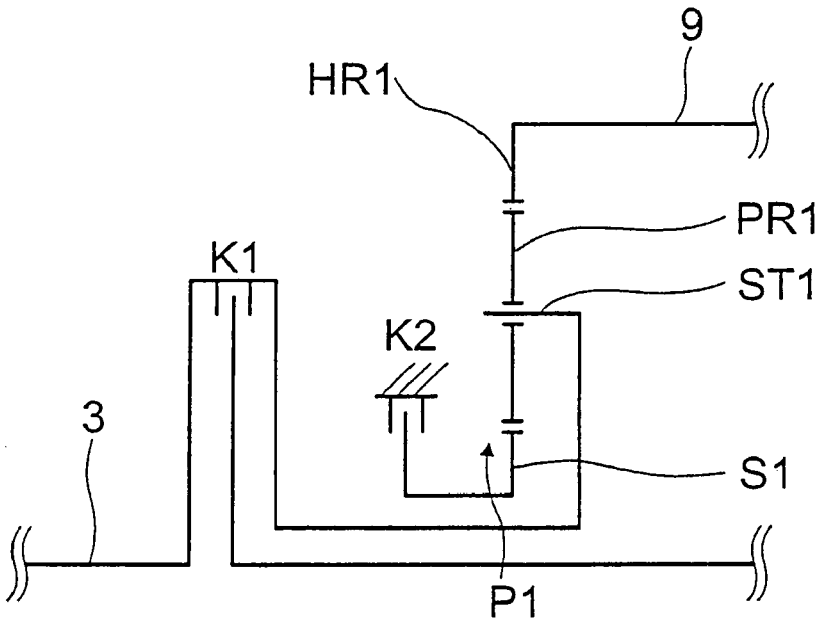
FIG. 5b is an additional possibility of an arrangement of the two frictional shifting elements of the planetary gear set 1 in accordance with FIGS. 1 and 3, whereby one of the frictional shifting elements is designed as a frictional brake.

In FIG. 5b the second frictional shifting element K2 is designed as a brake, by which the sun gear S1 of the first planetary get set can be brought into operational contact with a housing-affixed component 2 of the planetary transmission 1 whereby, in the case of this embodiment example of the planetary transmission 1, likewise, through a dual-sided control of the two frictional shifting elements K1 and K2, the shiftings between the gear stages "1" to "6" can be carried out free of traction interruption.

Now referring to FIG. 6, the strongly emphasized circular area Y shown in FIGS. 1 and 3, in which the optional shape-fit, shifting element C is placed, is shown in an individual drawing. By the shape-fit, shifting element C, the sun gear S2 of the second planetary gear set P2 can be braked against the housing-affixed component 2, i.e., against the housing of the planetary transmission 1 and is mutually locked to turn therewith. In this case, with the engaged shifting element C of the planetary transmission 1 in accordance with FIG. 1 and in the planetary transmission 1 according to FIG. 3, respectively, the eighth forward gear stage "8" can be shown upon a simultaneously engaged shifting element E2 and K2.

In the case of all embodiment examples described and depicted, including the more detailed enlarged drawings of the invented planetary transmission, there exists a competent control system, advantageously, a mechanical control, of the shape-fit, shifting elements, to produce in the planetary transmission a conviction of such a nature, that the transmission shaft 4 is arrested in motion and an output drive of a vehicle in the area of the planetary transmission 1 is held in the non-rotatable condition. This would, for example, be attained in that the main gear set, by simultaneous closure of several shape-fit, shifting elements is blocked and can anchor itself against the housing of the transmission or against the housing-affixed component of the planetary transmission. Thus, it is possible that advantageously, the omission of a parking block apparatus, such as may be found in vehicles with automatic transmissions, may be allowed.

Reference Numerals 1 planetary transmission
2 component, affixed to transmission housing, hence immobile
3 transmission input shaft
4 transmission output shaft
5 synchronizer ring
6 cone
7 blocking toothing for synchronizer ring
8 shifting collar
9 connection shaft
10 cone opposing shifting element f
11 blocking toothing for the shifting element f
12A, B toothing
13 additional synchronizer ring
14 additional shifting collar
15A, B opposing cone surface
16A, B opposing cone surface
17 blocking toothing
18A, B blocking toothing
A, B1, B2, C,
D E1, E2, F shape fit shifting element
eta efficiency of planetary transmission
F1 half-clutch of the shifting element f
HR1, HR2, HR3,
HR4, HR23 internal gears
I_ges total ratio
K11 half-clutch of the first frictional shifting element
phi stage to stage spring
K1 K2, frictional shifting elements
P1, P2, P3, P4, P23 planetary gear sets
PR1, PR2, PR3,
PR4, PR23 planetary gears
"R", "R1", "R2" reverse gears
S1, S2, S3, S4 sun gears
SR1, ST2, ST3, ST4 shafts
"1" to "8" gear stages

The invention claimed is:

1. A dual-clutch planetary transmission (1) comprising:
   first, second, third and fourth planetary gear sets (P1, P2, P3, P4),
   at least first and second frictional shifting elements (K1, K2) for selecting different power paths in a power flow, and
   first, second, third, fourth, fifth, sixth and seventh shape-fit, shifting elements (A to F) for selecting gear ratio stages in the power paths,
   the first planetary gear set (P1) being a simple planetary gear set,
   the second planetary gear set (P2), the third planetary gear set (P3) and the fourth planetary gear sets (P4) forming a 3-carrier-5-shaft transmission apparatus with separate planetary gears (PR2 to PR4),
   the first and the second frictional shifting elements (K1, K2) being positioned between a transmission input shaft (3) and the first planetary gear set (P1) and at least one of the first and the second frictional shifting elements (K1 K2) is a clutch, and
   the first, the second, the third, the fourth, the fifth, the sixth, and the seventh shape-fit, shifting elements (A to F) being arranged between the first planetary gear set (P1) and the second planetary gear set (P2), and
   the first, the second, the third, the fourth, the fifth, the sixth, and the seventh shape-fit, shifting elements (A to F) are positioned between shafts (S1 to S4, ST1 to ST4, HR1 to HR4) of the first, the second, the third, and the fourth planetary gear sets (P1 to P4), a housing (2), a transmission input shaft (3) and a transmission output shaft (4), such that at least first, second, third, fourth, fifth and sixth gear ranges (1 to 6) can be accomplished in a manner free of interruption of traction.

2. A dual-clutch planetary transmission (1) having first, second, third and fourth planetary gear sets (P1, P2, P3, P4), at least first and second frictional shifting elements (K1, K2) for up-shifting of different power paths in a power flow and with first, second, third, fourth, fifth, sixth and seventh shape-fit, shifting elements (A to F) for attaining various ratio stages in the power paths, the first and the second frictional shifting elements (K1, K2) and the first, the second, the third, the fourth, the fifth, and the sixth shape-fit, shifting elements (A to F) are positioned between shafts (S1 to S4, ST1 to ST4, HR1 to HR4) of the first, the second, the third and the fourth planetary gear sets (P1 to P4), a housing (2), a transmission input shaft (3) and a transmission output shaft (4) such that at least first, second, third, fourth, fifth and sixth gear ranges (1 to 6) can be obtained by the first and the second friction shifting elements (K1, K2) in a manner free of interruption of traction and at least one of the first and the second frictional shifting elements (K1, K2) is a clutch,
   wherein the second planetary gear set (P2), the third planetary gear set (P3) and the fourth planetary gear set (P4) form a reduced 3-carrier-5-shaft-transmission apparatus in which the second and the third planetary gear sets (P2, P3) are bound together by dual planetary gears (P23) without stepping.

3. The planetary transmission according to claim 1, wherein at least one of the first, the second, the third and the fourth shape fit shifting elements (K2) is a brake.

4. The planetary transmission according to claim 1, wherein the first and the second friction elements (K1, K2) are one of wet and dry elements.

5. The planetary transmission according to claim 1, wherein the first, the second, the third, the fourth, the fifth, the sixth and the seventh shape-fit, shifting elements (A to F) function as synchronized shifting elements.

6. The planetary transmission according to claim 1, wherein the first and the second frictional shifting elements (K1, K2) are in an area of a transmission input and the second, the third, the fourth, the fifth, the sixth, the seventh and an additional shape-fit, shifting elements (B1, B2, C, D, E1, E2, F) are placed between the first and the second frictional shifting elements (K1, K2) and the transmission output shaft (4).

7. The planetary transmission according to claim 1, wherein a first shaft (ST1) of the first planetary gear set (P1) can be operationally connected to the transmission input shaft (3) by the second frictional shifting element (K2).

8. A dual-clutch planetary transmission (1) having first, second, third and fourth planetary gear sets (P1, P2, P3, P4), at least first and second frictional shifting elements (K1, K2) for up-shifting of different power paths in a power flow and with first, second, third, fourth, fifth, sixth and seventh shape-fit, shifting elements (A to F) for attaining various ratio stages in the power paths, the first and the second frictional shifting elements (K1, K2) and the first, the second, the third, the fourth, the fifth, the sixth, and the seventh shape-fit, shifting elements (A to F) are positioned between shafts (S1 to S4, ST1 to ST4, HR1 to HR4) of the first, the second, the third, and the fourth planetary gear sets (P1 to P4), a housing (2), a transmission input shaft (3) and a transmission output shaft (4), such that at least first, second, third, fourth, fifth and sixth gear ranges (1 to 6) can be accomplished in a manner free of interruption of traction, and at least one of the first and the second frictional shifting elements (K1, K2) is a clutch, the second planetary gear set (P2), the third planetary gear set (P3) and the fourth planetary gear sets (P4) form a 3-carrier-5-shaft transmission apparatus with separate planetary gears (PR2 to PR4);
   the first planetary gear set (P1) being a simple planetary gear set, and wherein
   a first shaft (ST1) of the first planetary gear set (P1) is bound to the transmission input shaft (3) and an additional shaft (S1) of the first planetary gear set (P1) can be stopped by the second frictional shifting element (K2) acting against a housing-affixed component (2).

9. The planetary transmission according to claim 7, wherein a first shaft (ST1) of the first planetary gear set (P1) is connected with the transmission input shaft (3) and an additional shaft (HR1) of the first planetary gear set (P1) can be brought into operational communication with a shaft (S2) of the second planetary gear set (P2) by the second frictional shifting element (K2).

10. A dual-clutch planetary transmission (1) having first, second, third and fourth planetary gear sets (P1, P2, P3, P4), at least first and second frictional shifting elements (K1, K2) for up-shifting of different power paths in a power flow and with first, second, third, fourth, fifth, sixth and seventh shape-fit, shifting elements (A to F) for attaining various ratio stages in the power paths, the first and the second frictional shifting elements (K1, K2) and the first, the second, the third, the fourth, the fifth, the sixth, and the seventh shape-fit, shifting elements (A to F) are positioned between shafts (S1 to S4, ST1 to ST4, HR1 to HR4) of the first, the second, the third, and the fourth planetary gear sets (P1 to P4), a housing (2), a transmission input shaft (3) and a transmission output shaft (4), such that at least first, second, third, fourth, fifth and sixth gear ranges (1 to 6) can be accomplished in a manner free of interruption of traction, and at least one of the first and the second frictional shifting elements (K1, K2) is a clutch, the second planetary gear set (P2), the third planetary gear set (P3) and the fourth planetary gear sets (P4) form a 3-carrier-5-shaft transmission apparatus with separate planetary gears (PR2 to PR4), wherein a carrier (ST2) of the second planetary gear set (P2) is connected with a carrier (ST3) of the third planetary gear set (P3) and an internal gear (HR2) of the second planetary gear set (P2) is connected to an internal gear (HR3) of the third planetary gear set (P3).

11. The planetary transmission according to claim 10, wherein the internal gear (HR3) of the third planetary gear set (P3) is connected to a carrier (ST4) of the fourth planetary gear set (P4).

12. The planetary transmission according to claim 10, wherein a sun gear (S3) of the third planetary gear set (P3) and a sun gear (S4) of the fourth planetary gear set (P4) are connected with one another.

13. The planetary transmission according to claim 10, wherein an internal gear (HR4) of the fourth planetary gear set (P4) is connected with a housing-affixed component (2) by the first shape-fit, shifting element (A).

14. The planetary transmission according to claim 10, wherein a carrier (ST4) of the fourth planetary gear set (P4) is connected to the transmission output shaft (4).

15. The planetary transmission according to claim 10, wherein the carrier (ST2) of the second planetary gear set (P2) is connectable with a housing-affixed component (2) by the seventh shape-fit, shifting element (D).

16. The planetary transmission according to claim 10, wherein a sun gear (S2) of the second planetary gear set (P2) is connectable with an internal gear (HR1) of the first planetary gear set (P1) by a third shape-fit, shifting element (B2).

17. The planetary transmission according to claim 10, wherein a sun gear (S2) of the second planetary gear set (P2) is connectable with an internal gear (HR1) of the first planetary gear set (P1) and with the carrier of the (ST3) of the third planetary gear set (P3) by the third and the fifth shape-fit shifting, elements (B2, E2).

18. The planetary transmission according to claim 10, wherein a sun gear (S3) of the third planetary gear set (P3) is connectable with the transmission input shaft (3) by the second shape-fit, shifting element (B1) and the first frictional shifting element (K1).

19. The planetary transmission according to claim 10, wherein the transmission input shaft (1) is connectable with the transmission output shaft (4) by the first frictional shifting element (K1) and a seventh shape-fit, shifting element (F).

20. The planetary transmission according to claim 10, wherein a sun gear (S3) of the third planetary gear set (P3) is brought into operational connection with a carrier (ST1) of the first planetary gear set (P1) by the second and the fifth shape-fit, shifting elements (B1 and E2) and the first and the second frictional shifting elements (K1, K2).

21. The planetary transmission according to claim 10, wherein a sun gear (S2) of the second planetary gear set (P2) is connectable to a housing-affixed component (2) by an additional shape-fit, shifting element (C).

22. The planetary transmission according to claim 10, wherein the second planetary gear set (P2) and the third planetary gear set (P3) form a fourth planetary gear set (P23) with a common carrier (ST23) and a common internal gear (HR23), planetary gears (PR23) of the fourth planetary gear set (P23), secured in bearings on the common carrier (ST23), are in tooth engagement with a sun gear (S2) of the second planetary gear set (P2) and a sun gear (S3) of the third planetary gear set (P3).

23. The planetary transmission according to claim 22, wherein the common internal gear (HR23) of the fourth planetary gear set (P23) is connected to a carrier (ST4) of the fourth planetary gear set (P4).

24. The planetary transmission according to claim 10, wherein at least one of the second, the fourth and the seventh shape-fit, shifting elements (F, B1, E1) is shifted by shifting collars (8, 14) which extend from the housing (2) into an interior of the housing (2), by a connection shaft (9) which runs between the first planetary gear set (P1) and the second and the fourth planetary sets (P2 to P4), thereby engaging synchronizing rings (5, 13) which in turn engage the second, the fourth and the seventh shifting elements (F, B1, E1).

* * * * *